(12) United States Patent
Boyd et al.

(10) Patent No.: US 10,865,271 B2
(45) Date of Patent: Dec. 15, 2020

(54) EPOXY COMPOSITIONS AND SURFACING FILMS THEREFROM

(71) Applicant: 3M INNOVATIVE PROPERTIES COMPANY, St. Paul, MN (US)

(72) Inventors: Scott A. Boyd, White Bear Lake, MN (US); Dmitriy Salnikov, Woodbury, MN (US); David T. Amos, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/006,659

(22) Filed: Jun. 12, 2018

(65) Prior Publication Data
US 2018/0291139 A1 Oct. 11, 2018

Related U.S. Application Data

(63) Continuation of application No. 12/975,478, filed on Dec. 22, 2010, now abandoned.

(60) Provisional application No. 61/290,719, filed on Dec. 29, 2009.

(51) Int. Cl.
*C08G 59/40* (2006.01)
*C08L 63/00* (2006.01)
*C08L 79/00* (2006.01)

(52) U.S. Cl.
CPC ..... *C08G 59/4021* (2013.01); *C08G 59/4042* (2013.01); *C08L 63/00* (2013.01); *C08L 79/00* (2013.01)

(58) Field of Classification Search
CPC . C08G 59/4021; C08G 59/4042; C08L 63/00; C08L 79/00; C08L 2203/16; C08L 2205/02; C08L 2666/20; C08J 5/24; C08J 2363/00; C08J 5/18
See application file for complete search history.

(56) References Cited

U.S. PATENT DOCUMENTS

| | | | |
|---|---|---|---|
| 5,393,839 A | 2/1995 | Iwamoto | |
| 5,679,730 A | 10/1997 | Amano | |
| 5,728,432 A * | 3/1998 | Imashiro | C08G 18/025 427/207.1 |
| 6,063,890 A * | 5/2000 | Tye | C08G 59/4042 528/45 |
| 6,103,836 A * | 8/2000 | Imashiro | H05K 1/0346 525/452 |
| 6,140,454 A | 10/2000 | Amano | |
| 6,172,143 B1 | 1/2001 | Amano | |
| 6,331,226 B1 | 12/2001 | Imashiro | |
| 6,524,711 B2 * | 2/2003 | Imashiro | C08G 18/025 156/330 |
| 6,664,345 B2 * | 12/2003 | Yamoto | C08G 18/0814 523/415 |
| 6,670,006 B1 * | 12/2003 | Sugimori | C08G 59/226 428/36.9 |
| 2003/0196759 A1 | 10/2003 | Yamaguchi | |
| 2003/0235750 A1 | 12/2003 | Tanno | |
| 2005/0255311 A1 * | 11/2005 | Formella | B29C 70/46 428/323 |
| 2009/0314523 A1 | 12/2009 | Ito | |
| 2010/0129663 A1 | 5/2010 | Salnikov | |
| 2010/0151186 A1 | 6/2010 | Hebert | |
| 2010/0151239 A1 | 6/2010 | Hebert | |
| 2010/0263898 A1 | 10/2010 | Hebert | |
| 2010/0264665 A1 | 10/2010 | Hebert | |

FOREIGN PATENT DOCUMENTS

| | | |
|---|---|---|
| JP | 0 953 621 | 11/1999 |
| JP | 2001-123043 | 5/2001 |
| JP | 2007-238652 | 9/2007 |
| WO | WO 2007/127032 | 11/2007 |
| WO | WO 2007/130196 | 11/2007 |

OTHER PUBLICATIONS

International Search Report, Form PCT/ISA/210, International Application No. PCT/US2010/061693, International Filing Date: Dec. 22, 2010, 4 pages.
Alberino et al. "Preparation and Properties of Polycarbodiimides", *Journal of Applied Polymer Science*, vol. 21, (1977). pp. 1999-2008.
Campbell et al. "Carbodiimides. IV. High Polymers Containing the Carbodiimide Repeat Unit", *J. Org. Chem.*, vol. 28, Issue 8, (1963). pp. 2069-2075.
Lyman et al. "Polycarbodiimides and their Derivatives", *Stanford Research Institute*, (1963), pp. 1-9.

\* cited by examiner

*Primary Examiner* — Michael N Orlando
*Assistant Examiner* — Cynthia L Schaller
(74) *Attorney, Agent, or Firm* — Philip P. Soo

(57) ABSTRACT

A composition is provided comprising: a) a curable epoxy resin; and b) 0.01-30% by weight of a polycarbodiimide according to Formula I:

$$R-\{-N=C=N-R-\}_n-N=C=N-R \qquad (I)$$

wherein n is an integer between 0 and 100, and wherein each R is independently selected from aromatic and aliphatic groups which contain between 1 and 24 carbons and which are optionally substituted, typically comprising 0.1-20% by weight of the polycarbodiimide. In some embodiments the present disclosure provides sheet materials made of such cured, uncured or partially cured materials. In some embodiments these compositions may be useful in making surfacing films for composite parts and may demonstrate good paint stripper resistance and microcrack resistance.

13 Claims, No Drawings

EPOXY COMPOSITIONS AND SURFACING FILMS THEREFROM

CROSS-REFERENCE TO RELATED APPLICATION

This application is a continuation of U.S. application Ser. No. 12/975,478, filed Dec. 22, 2010, which application claims priority to U.S. Provisional Patent Application No. 61/290,719, filed Dec. 29, 2009, the disclosures of which are incorporated by reference herein in their entirety.

FIELD OF THE DISCLOSURE

This disclosure relates to epoxy compositions including polycarbodiimide species, in particular epoxy compositions useful in making surfacing films with good paint stripper resistance and micro crack resistance.

SUMMARY OF THE DISCLOSURE

Briefly, the present disclosure provides a composition comprising: a) a curable epoxy resin; and b) 0.01-30% by weight of a polycarbodiimide according to Formula I:

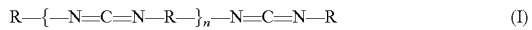

wherein n is an integer between 0 and 100, and wherein each R is independently selected from aromatic and aliphatic groups which contain between 1 and 24 carbons and which are optionally substituted. The composition typically comprises 0.1-20% by weight of the polycarbodiimide and may in some embodiments comprise 0.1-10% by weight of the polycarbodiimide, in some embodiments 0.5-5% by weight of the polycarbodiimide, and in some embodiments 1-3% by weight of the polycarbodiimide. In some embodiments n is at least 1. In some embodiments n is at least 2. In some embodiments, R contains between 3 and 12 carbons. In some embodiments all R groups are aromatic. In some embodiments all R groups are phenyl or phenylene. In some embodiments the present disclosure provides compositions which are the composition described above being partially cured or fully cured. In some embodiments the present disclosure provides sheet materials made of such cured, uncured or partially cured materials. In some embodiments the present disclosure provides composite parts comprising the cured composition. In some embodiments the present disclosure provides composite parts having an outermost surface comprising the cured composition.

In this application, "substituted" means, for a chemical species, group or moiety, substituted by conventional substituents which do not interfere with the desired product or process, e.g., substituents can be alkyl, alkoxy, aryl, phenyl, halo (F, Cl, Br, I), cyano, nitro, etc.

DETAILED DESCRIPTION

The present disclosure provides epoxy compositions which, in some embodiments, may be used to form surfacing films demonstrating increased resistance to paint strippers.

The present disclosure provides uncured epoxy compositions and cured epoxy compositions that resulting from the cure of the uncured epoxy compositions provided herein. The uncured epoxy composition may include any suitable epoxide resin, including epoxide monomers or epoxide prepolymers, and any suitable hardener, typically an amine hardener. In some embodiments, the uncured epoxy composition may include any suitable crosslinker, in addition to those described below. In some embodiments, the uncured epoxy composition includes no crosslinker other than those described below.

In some embodiments, the uncured epoxy composition includes a carbodiimide species, which is typically a polycarbodiimide species. Typically, the polycarbodiimide species is isocyanate capped, more typically, the isocyanate capped polycarbodiimide species is according to Formula I:

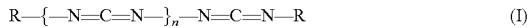

wherein n is an integer, typically between 0 and 100, more typically between 1 and 20, which may vary or may be a single value; and where each R is independently selected from aromatic and aliphatic groups which may optionally be substituted and which typically contain between 1 and 24 carbons, more typically between 3 and 12 carbons. In some embodiments, all R groups are aromatic. In some embodiments, all R groups are phenyl or phenylene. In some embodiments, the isocyanate capped polycarbodiimide species is a phenyl isocyanate capped toluene diisocyanate polycarbodiimide.

In some embodiments, the uncured epoxy composition includes an oxazolidone ring-containing epoxy resin. In some embodiments, the uncured epoxy composition includes both an oxazolidone ring-containing epoxy resin and a polycarbodiimide species as described above.

In some embodiments, uncured or cured epoxy compositions according to the present disclosure may additionally comprise fillers, pigments, carbon particles, or carbon nanotube materials.

In some embodiments, uncured epoxy compositions according to the present invention may be formed into films by any suitable method. In some embodiments, such films may be used as surfacing films. In some embodiments, such films may be used as surfacing films in the manufacture of fiber-matrix composite parts. Typically, such a surfacing film is cured during cure of the composite matrix, and becomes a cured-in component of the composite part forming the outer surface of the composite part.

In some embodiments, such films may be used to form a multi-layered construct with polyvinylidene fluoride (PVDF) films, which may in some embodiments be used as surfacing films. In some embodiments, such films may be used in applications such as and including those described in U.S. patent application Ser Nos. 12/761,162, 12/761,212, 12/625,002, 12/637,879 and 12/637,915, the disclosures of which are incorporated herein by reference.

In some embodiments, epoxy compositions according to the present invention may be used as curable adhesives.

In some embodiments, epoxy compositions according to the present invention may be used as matrix materials in prepregs or in fiber-matrix composite parts Objects and advantages of this disclosure are further illustrated by the following examples, but the particular materials and amounts thereof recited in these examples, as well as other conditions and details, should not be construed to unduly limit this disclosure.

EXAMPLES

Unless otherwise noted, all reagents were obtained or are available from Aldrich Chemical Co., Milwaukee, Wis., or may be synthesized by known methods.

The following abbreviations are used to describe the examples:
° F.: Degrees Fahrenheit
° C.: Degrees Centigrade rpm: Revolutions per minute
mil: $10^{-3}$ inches
µ-inch: $10^{-6}$ inches
µm: micrometers
mm: millimeters
cm: centimeters
kPa: kilopascals
psi: pounds per square inch
mg: milligrams Test Methods Pencil Hardness. Gouge hardness of the test surface was measured according to ASTM D3363-05. Hardness was reported for the hardest pencil that left the test surface uncut for a stroke length of at least 3 mm, using pencils obtained from General Pencil Company, Redwood City, Calif.

Surface Roughness. Surface roughness was measured with a portable surface profile gauge, model "POCKET-SURF", obtained from Mahr Federal, Inc., Providence, R.I. The reported results were the average of 5 readings.

Paint Stripper Uptake. The test panel was weighed and an area of 4 cm by 5 cm was marked. Four grams of a benzyl alcohol-based paint stripper, type "CEE BEE E2012A", obtained from Cee Bee Aviation Products, McGean-Rohco, Inc. Cleveland, Ohio, was brushed onto the test area. After 24 hours at 70° F. (21.1° C.) the paint stripper was manually scraped off the test area, and the panel then rinsed with iso-propyl alcohol. After drying the panel for 60 minutes at 70° F. (21.1° C.) it was reweighed. The increased weight of the test panel was reported as paint stripper uptake.

Panel Mark Off. The test panel was visually inspected following the paint stripper uptake test. Any deterioration in appearance was recorded accordingly.

Micro Crack Testing. Micro crack testing was performed on primed and painted test panels. The primer was CA 7501 two part fluid resistance gray applied as a single light coat. The paint was 8800 three part white topcoat, applied to the primed panel in two coats. The paint and primer are available from PRC Desoto, Sylmar, Calif. Mixing and drying were performed as per manufacturer's instructions. Micro crack testing was conducted in a thermal shock chamber, a two chamber oven with a shuttle that can be moved between the two chambers. One chamber was set at −54° C. (−65° F.) and the other at 49° C. (120° F.). The shuttle is programmed to sit in each chamber for 10 minutes before moving back to the other chamber. Samples were placed on a rack which was loaded onto the shuttle. The samples were cycled between the two chambers between 3000 and 4000 cycles. The panels were inspected for micro cracks using an optical microscope at a magnification of 16×. A known area is inspected and the cracks per linear cm were calculated. Zero cracks observed after all cycles were complete was rated a "pass", less than or equal to 0.25 cracks per linear cm was rated a "marginal pass", and greater than 0.25 cracks per linear cm was rated a "fail".

Materials Used

C-150 HP: Agglomerates of multi-walled carbon nanotubes, available under the trade designation "BAYTUBES C-150 HP", from Bayer Material Science AG, Leverkusen, Germany.

CG-1400: A micronized dicyandiamide, having an approximate amine equivalent weight of 21 grams/equivalent, available under the trade designation "AMICURE CG-1400", from Air Products and Chemicals Incorporated, Allentown, Pa.

DER 6508: A 2-functional epoxy resin which has been chemically modified to allow the formulation of highly crosslinked, heat-resistant systems having an approximate epoxy equivalent weight of 400 grams/equivalent, available under the trade designation "D.E.R. 6508" from Dow Chemical Company, Midland, Mich.

DEH-85: An unmodified phenolic hardener having an active hydrogen equivalent weight of approximately 265 grams/equivalent, available under the trade designation "DEH-85", from Dow Chemical Company, Midland, Mich.

EP 7200: A modified bisphenol-A epoxy resin with an approximate equivalent weight of approximately 207.5 grams/equivalent, available under the trade designation "EPALOY 7200", from CVC Specialty Chemicals Inc., Moorestown, N.J.

Epon 826: A low viscosity liquid bisphenol A based epoxy resin having an approximate equivalent weight of 182 650 grams/equivalent, available under the trade designation "EPON 826", from Hexion Specialty Chemicals, Columbus, Ohio.

EPON 1002F: A bisphenol-A polyepoxide resin having a functionality of 2 and an approximate epoxy equivalent weight of 650 grams/equivalent, available under the trade designation "EPON 1002F", from Hexion Specialty Chemicals, Columbus, Ohio.

EPON 1004F: A bisphenol-A polyepoxide resin having a functionality of 2 and an approximate epoxide equivalent weight of 875 grams/equivalent, available under the trade designation "EPON 1004F", from Hexion Specialty Chemicals.

F-1. A polyester anti-crater and flow additive, available under the trade designation "Dynoadd F-1", from Dynea, Helsinki, Finland.

MEK: Methyl ethyl ketone.

MX-120: A diglycidyl ether of Bisphenol-A epoxy resin butadiene-acrylic co-polymer core shell rubber having an approximate epoxy equivalent weight of 243 grams/equivalent, available under the trade designation "KANE ACE MX-120", from Kaneka Texas Corporation, Pasadena, Tex.

MY-720: A tetra-functional liquid epoxy, having an approximate epoxy equivalent weight of 125.5 grams/equivalent, available under the trade designation "ARALDITE MY-720", from Huntsman Advanced Materials America Incorporated, The Woodlands, Tex.

PCDI 77.5%: A phenyl isocyanate capped toluene diisocyanate polycarbodiimide, having a 2:1 ratio by weight toluene diisocyanate:phenyl isocyanate, at approximately 77.5% by weight in toluene, prepared as follows: To a clean dry 3-liter flask under a nitrogen atmosphere, 600 g of toluene diisocyanate, 205 g of phenyl isocyanate, and 184 g of toluene were charged. The solution was mixed, to which a catalyst premix of 7.7 grams of 3-methyl-1-phenyl-2-phospholene-1-oxide in 11.6 grams of toluene, was then added. The batch slowly heated, for approximately 60 minutes, to 230° F., then held at this temperature for 4 hours. Using infrared spectroscopy to confirm the isocyanate had been consumed, the mixture was then cooled 75° F.

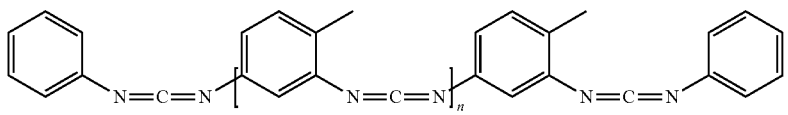

PCDI 40%: A phenyl isocyanate capped toluene diisocyanate polycarbodiimide, having a 2:1 ratio by weight toluene diisocyanate:phenyl isocyanate, at approximately 40% by weight in toluene, prepared as follows: To a clean dry 2-liter flask under a nitrogen atmosphere, 320 g of toluene diisocyanate, 109.4 g of phenyl isocyanate, and 480 g of toluene were charged. The solution was mixed, to which a catalyst premix of 1.84 grams of 3-methyl-1-phenyl-2-phospholene-1-oxide in 12.5 grams of toluene, was then added. The batch was slowly heated, for approximately 60 minutes, to 230° F., then held at this temperature for 3 hours. Using infrared spectroscopy to confirm the isocyanate had been consumed, the mixture was then cooled 75° F.

PKHP: A micronized phenoxy resin, having a number average molecular weight (MN) 10,000-16,000, and a hydroxy equivalent weight 284 grams/equivalent, available under the trade designation "PAPHEN PKHP-200", from Phenoxy Associates, Rock Hill, S.C. USA.

R-960: A rutile titanium dioxide pigment, available under the trade designation "TI-PUR R-960", from E.I. du Pont de Nemours & Company, Wilmington, Del.

RA95: A high viscosity, Bisphenol A epoxy resin modified butadeine-acrylonitrile elastomer having an approximate epoxy equivalent weight of 202.5 grams/equivalent, available under the trade designation "Hypox RA95" from CVC Specialty Chemicals Inc., Moorestown, N.J.

SU-2.5: A bisphenol-A polyepoxide resin having a functionality of 2.5 and an approximate epoxy equivalent weight of 190 grams/equivalent, available under the trade designation "EPON SU-2.5", from Hexion Specialty Chemicals.

SU-8: A bisphenol-A polyepoxide resin having a functionality of 8 and an approximate epoxy equivalent weight of 212.5 grams/equivalent, available under the trade designation "EPON SU-8", from Hexion Specialty Chemicals.

U-52: An aromatic substituted urea (4,4'-methylene bis (phenyl dimethyl urea), having an approximate amine equivalent weight of 170 grams/equivalent, available under the trade designation "OMICURE U-52", from CVC Specialty Chemicals Incorporated.

VYG: A copper-phthalocyanine pigment, available under the trade designation "VYNAMON GREEN 600734", from Heucotech Ltd., Fairless Hills, Pa.

XAC-4151: An oxazolidone ring containing epoxy, having an approximate epoxy equivalent weight of 420 grams/equivalent, available under the trade designation "XAC-4151", from Asahi Kasei, Kanto, Japan.

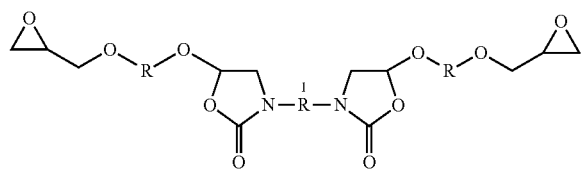

AF 191U: A thermosetting modified epoxy structural adhesive film, having a base weight of approximately 0.05 pounds per square foot (lbs/ft$^2$) (244.2 grams per square centimeter (g/cm$^2$)), available under the trade designation "SCOTCH-WELD STRUCTURAL ADHESIVE FILM, 0.05", from 3M Company, St. Paul, Minn.

SM 905M: A composite surfacing film, having a base weight of 0.020 lbs/ft$^2$ (171 g/cm$^2$), available under the trade designation "SURFACE MASTER 905M", from Cytec Engineered Materials, Inc., Tempe, Ariz.

Preparation of Resin Compositions

Comparatives and Examples were prepared as described below, according to the compositions listed in Tables 1 and 2.

TABLE 1

| Component | Comparative A | Example 1 | Example 2 | Example 3 | Example 4 |
|---|---|---|---|---|---|
| XAC-4151 | 19.15 | 0 | 18.05 | 16.60 | 16.16 |
| MX-120 | 19.15 | 18.05 | 18.05 | 16.60 | 16.16 |
| SU-2.5 | 19.15 | 18.05 | 18.05 | 16.60 | 16.16 |
| MY-720 | 15.32 | 2.89 | 2.89 | 2.66 | 2.59 |
| CG-1400 | 6.85 | 3.77 | 3.77 | 3.47 | 3.38 |
| U-52 | 0.38 | 0.20 | 0.20 | 0.18 | 0.18 |
| EPON 1002F | 0 | 18.05 | 0 | 0 | 0 |
| PCDI 77.5% | 0 | 24.4 | 24.40 | 22.45 | 21.85 |
| VYG | 0 | 0 | 0 | 1.53 | 0 |
| R-960 | 0 | 0 | 0 | 4.78 | 7.69 |
| C-150 HP | 0 | 0 | 0 | 0 | 0.58 |
| MEK | 17.0 | 14.59 | 14.59 | 15.13 | 15.25 |
| Toluene | 3.0 | 0 | 0 | 0 | 0 |

TABLE 2

| Component | Example 5 | Example 6 |
|---|---|---|
| XAC4151 | 14.81 | |
| DER6508 | | 19.41 |
| SU-8 | 5.82 | 7.63 |
| MX-120 | 16.05 | 21.25 |
| MY-720 | 2.57 | 3.37 |
| PCDI 77.5% | 21.69 | |
| PCDI 40% | | 5.51 |
| Epon 826 Milling | 8.02 | 7.35 |
| CG-1400 | 3.36 | 4.4 |
| U-52 | 0.18 | 0.23 |
| VYG | 0.49 | 0.47 |
| R-960 | 2.46 | 2.33 |
| RA95 | 9.22 | 9.55 |
| Epon 826 Letdown | | 1.06 |
| F-1 | 0.69 | 0.75 |
| MEK | 14.65 | 16.46 |
| Toluene | | 0.23 |

Comparative A

XAC-4151 was manually crushed with a pestle and mortar and charged into a 200 gram capacity plastic cup designed for use in a planetary mill, model "SPEED MIXER Model DA 400 FV", available from Synergy Devices Limited, Buckinghamshire, United Kingdom. 85:15 MEK/toluene was added to the cup, which was then secured to the mill and rotated at 2,200 rpm until the mixture was dissolved, approximately 5 minutes. The cup was removed from the mill, to which MX-120, SU-2.5 and MY-720 were added, and the mixing continued for another 2 minutes at 2,200 rpm. The cup was again removed from the mill and CG-1400 and U-52 were added. The mixture was manually stirred to wet out the curatives and the cup returned to the mill for another 2 minutes at 2,200 rpm, until all components were homogeneously dispersed.

Example 1

Epon 1002F was manually crushed with a pestle and mortar and charged into a 200 gram capacity plastic cup, to which MEK was added. The cup was placed in the planetary mill, and mixed at 2,200 rpm until dissolved, approximately 5 minutes. The cup was removed from the mill, to which MX-120, SU-2.5, MY-720 and PCDI were added, and the mixing continued for another 2 minutes at 2,200 rpm. The cup was again removed from the mill and CG-1400 and U-52 were added. The mixture was manually stirred to wet out the curatives and the cup returned to the mill for another 2 minutes at 2,200 rpm, until all components were homogeneously dispersed.

Example 2

The process as described in Example 1 was repeated according to the composition listed in Table 1, wherein the Epon 1002F was replaced with XAC-4151.

Example 3

R-960, VYG and SU-2.5 were charged into a 200 gram capacity plastic cup. The cup was placed in the planetary mill, and mixed at 2,200 rpm for 2 minutes. The mixture was then milled in a three-roll paint mill for three passes and set aside. XAC-4151 was manually crushed with a pestle and mortar and added to a planetary mill cup, followed by MEK, and mixed in the planetary mill at 2,200 rpm until dissolved, approximately 5 minutes. The cup was removed from the mill, to which the R-960, VYG and SU-2.5 from the three-roll paint mill, followed by MX-120, MY-720 and PCDI were added. The mixture was returned to the planetary mill, and the mixing continued for another 2 minutes at 2,200 rpm. The cup was removed from the planetary mill and CG-1400 and U-52 were added. The mixture was manually stirred to wet out the curatives and the cup returned to the planetary mill for another 2 minutes at 2,200 rpm, until all components were homogeneously dispersed.

Example 4

Example 3 was repeated, wherein the VYG was replaced with CNT.

Example 5

R-960, VYG, CG-1400, U-52 and Epon 826 were charged into a 200 gram capacity plastic cup. The cup was placed in the planetary mill, and mixed at 2,200 rpm for 2 minutes. The mixture was then milled in a three-roll paint mill for three passes and set aside. XAC4151 and SU-8 were manually crushed with a pestle and mortar and added to a planetary mill cup, followed by MEK, and mixed in the planetary mill at 2,200 rpm until dissolved, approximately 10 minutes. The cup was removed from the mill, to which the R-960, VYG, CG-1400, U-52 and Epon 826 from the three-roll paint mill, followed by MX-120, MY-720, F-1, RA-95 and PCDI 77.5% were added. The mixture was returned to the planetary mill, and the mixing continued for another 2 minutes at 2,200 rpm. The mixture was manually stirred to scrape the sides of the cup and returned to the planetary mill for another 2 minutes at 2,200 rpm, until all components were homogeneously dispersed.

Example 6

R-960, VYG, CG-1400, U-52 and Epon 826 were charged into a 200 gram capacity plastic cup. The cup was placed in the planetary mill, and mixed at 2,200 rpm for 2 minutes. The mixture was then milled in a three-roll paint mill for three passes and set aside. DER 6508 and SU-8 were manually crushed with a pestle and mortar and added to a planetary mill cup, followed by MEK, and mixed in the planetary mill at 2,200 rpm until dissolved, approximately 10 minutes. The cup was removed from the mill, to which the R-960, VYG, CG-1400, U-52 and Epon 826 from the three-roll paint mill, followed by MX-120, MY-720, F-1, RA-95, remaining Epon 826, toluene and PCDI 40% were added. The mixture was returned to the planetary mill, and the mixing continued for another 2 minutes at 2,200 rpm. The mixture was manually stirred to scrape the sides of the cup and returned to the planetary mill for another 2 minutes at 2,200 rpm, until all components were homogeneously dispersed.

Preparation of Composite Panels

Within one hour of preparation the resin compositions were notch bar coated onto a bleached silicone coated release liner, product # "23210 76 #BL KFT H/HP 4D/6MH" Loparex, Inc., Iowa City, Iowa, at a bar gap of 6 mil (152.4 µm). The coated liner was then allowed to dry for at least 1 hour at about 70° F. (21.1° C.).

Coupons of the dried polymeric composites Comparative A, Examples 1-7, plus adhesive structural film 905M (designated Comparative B), and composite surfacing film AF 191U (designated Comparative C), were prepared as follows. Each surfacing film was trimmed to 12-inch by 12-inch (30.4 by 30.4 cm) sections and applied to a layup tool. One ply of pre-impregnated graphite fabric, followed by additional plies of unidirectional pre-impregnated grade 190 graphite tape, orientated at 0/+45/+90/−45/0/0/−45/90/+45/0 degrees. The layup was placed in a vacuum bag with surfacing film directly against the tool surface which was then positioned in an autoclave. A full vacuum of about 28 inches mercury (94.8 kPa) was applied at approximately 72° F. (22° C.) for 10 to 15 minutes after which the external pressure was gradually increased to 55 psi (397 kPa). The vacuum bag was kept under full vacuum (28 inches of Hg) for the duration of the cure cycle, and the temperature was raised at 5° F. per minute (2.8° C. per minute) up to 350° F. (177° C.) and held at this temperature for 2 hours. The cured polymeric composite article with surfacing approximately 72° F. (22° C.) temperature, at which point the pressure was released, and the cured article having an approximate thickness of 0.045 inches (0.114 mm) was removed from the autoclave and vacuum bag.

Each coupon was measured for pencil hardness, gloss, surface roughness, panel mark off and paint stripper uptake. In addition, coupons corresponding to Examples 5 and 6 were tested for microcrack resistance. Results are listed in Table 3.

TABLE 3

| | Test Data | | | | | | |
|---|---|---|---|---|---|---|---|
| | Pencil Hardness | | Surface Roughness µ-inch (µm) | | Panel Mark Off | Paint Stripper Uptake (mg/cm$^2$) | Micro Crack |
| Sample | Initial | 24 Hours, Δ Change in pencil hardness | Initial | 24 Hours | 24 Hours | 24 Hours | |
| Comparative A | 4H | B6 | 15.3 (0.39) | 39.7 (1.01) | No | 1.98 | |
| Comparative B | 6H | H5 | 30.6 (0.78) | 90.0 (2.29) | Yes | 2.46 | |
| Example 1 | 4H | 3H1 | 19.5 (0.50) | 26.8 (0.68) | No | 1.53 | |
| Example 2 | 4H | 4H0 | 15.7 (0.40) | 15.0 (0.38) | No | 1.97 | |
| Example 3 | 4H | 4H0 | 15.0 (0.38) | 18.3 (0.47) | No | 0.44 | |
| Example 4 | 4H | 4H0 | 15.8 (0.40) | 17.2 (0.44) | No | 0.96 | |
| Example 5 | 6H | 6H0 | 38 (0.97) | 39.6 (1.01) | No | 0.23 | Fail |
| Example 6 | 6H | 6H0 | 29.2 (0.74) | 32.4 (0.82) | No | 0325 | Pass |

The Examples according to the present disclosure showed better resistance to degradation in various tests when challenged with paint stripper. Example 6 additionally demonstrated good micro crack resistance. This additional characteristic is believed to be result from limiting the amount of PCDI to an amount in the range of 0.5-5% or more specifically between 1% and 3%.

Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:

1. A method of increasing paint stripper resistance and microcrack resistance of a fiber-matrix composite part, the method comprising:
    disposing onto an outermost surface of an uncured fiber-composite matrix a composition comprising:
        a curable oxazolidone ring-containing epoxy resin; and
        1-3% by weight of a mono- or polycarbodiimide according to Formula I:

    $$R\{N{=}C{=}N-R-\}_n\text{-}N{=}C{=}N-R \quad (I)$$

wherein n is an integer between 0 and 100 and wherein each R is independently selected from aromatic and aliphatic groups which contain between 1 and 24 carbons; and
    curing the composition and uncured fiber-composite matrix to obtain a fiber-matrix composite part with a surfacing film thereon having increased paint stripper resistance and microcrack resistance.

2. The method according to claim 1 wherein n is at least 1.

3. The method according to claim 1 wherein n is at least 2.

4. The method according to claim 1 wherein R contains between 3 and 12 carbons.

5. The method according to claim 1 wherein all R groups are aromatic.

6. The method according to claim 1 wherein all R groups are selected from the group consisting of phenyl, toluyl, phenylene and methyl-phenylene.

7. The method according to claim 1 wherein the surfacing film is a cured-in component of the composite part forming the outer surface of the composite part.

8. The method according to claim 7 wherein the composition is applied to a layup tool prior to being disposed onto the outermost surface of the uncured fiber-composite matrix.

9. The method according to claim 1, wherein the composition and uncured fiber-composite matrix are cured by autoclaving.

10. The method according to claim 1, wherein the composition is disposed on a release liner and dried prior to disposing the composition onto the outermost surface of the uncured fiber-composite matrix.

11. The method of claim 1 wherein the uncured fiber-composite matrix comprises one or more plies of pre-impregnated carbon fiber.

12. The method according to claim 1, wherein the surfacing film has an exposed surface and further comprising the step of applying a paint to the exposed surface.

13. The method according to claim 1 wherein the composition disposed on the uncured fiber-composite matrix as a sheet having a thickness of less than 0.5 mm.

* * * * *

UNITED STATES PATENT AND TRADEMARK OFFICE
CERTIFICATE OF CORRECTION

PATENT NO. : 10,865,271 B2  Page 1 of 1
APPLICATION NO. : 16/006659
DATED : December 15, 2020
INVENTOR(S) : Scott Boyd It is certified that error appears in the above-identified patent and that said Letters Patent is hereby corrected as shown below:

In the Specification

Column 2
Line 10, delete "R—{—N=C=N—}$_n$—N=C=N—R" and insert
-- R—{—N=C=N—R—}$_n$—N=C=N—R --, therefor.

In the Claims

Column 9
Line 48, in Claim 1, delete "R{N=C=N—R-}$_n$-N=C=N—R" and insert
-- R—{—N=C=N—R—}$_n$—N=C=N—R --, therefor.

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*